United States Patent
Miller et al.

(10) Patent No.: US 11,262,944 B1
(45) Date of Patent: Mar. 1, 2022

(54) PLACEMENT OF DATA OBJECTS IN STORAGE FOR IMPROVED RETRIEVAL

(71) Applicant: Amazon Technologies, Inc., Seattle, WA (US)

(72) Inventors: Kevin C. Miller, Bainbridge Island, WA (US); James C. Kirschner, Seattle, WA (US); Robert J. Czarnecki, Seattle, WA (US); Paul D. Franklin, Seattle, WA (US); Rishabh Animesh, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/587,854

(22) Filed: Sep. 30, 2019

(51) Int. Cl.
  *G06F 3/06* (2006.01)
  *B65G 1/137* (2006.01)
  *H04L 29/08* (2006.01)
  *H04L 67/1097* (2022.01)
  *H04L 67/02* (2022.01)

(52) U.S. Cl.
  CPC ......... *G06F 3/0659* (2013.01); *B65G 1/1371* (2013.01); *G06F 3/067* (2013.01); *G06F 3/0611* (2013.01); *H04L 67/1097* (2013.01); *G05B 2219/45083* (2013.01); *H04L 67/02* (2013.01)

(58) Field of Classification Search
  CPC ...... G06F 3/067; G06F 3/0604; G06F 3/0611; G06F 3/0635; G06F 3/0659
  See application file for complete search history.

(56) References Cited

U.S. PATENT DOCUMENTS

| | | | |
|---|---|---|---|
| 7,402,018 B2 | 7/2008 | Mountz et al. | |
| 7,873,469 B2 | 1/2011 | D'Andrea et al. | |
| 7,894,932 B2 | 2/2011 | Mountz et al. | |
| 8,725,286 B2 | 5/2014 | D'Andrea et al. | |
| 8,831,984 B2 | 9/2014 | Hoffman et al. | |
| 8,972,045 B1 | 3/2015 | Mountz et al. | |
| 9,891,866 B1* | 2/2018 | Lazier | G06F 3/0659 |
| 9,923,966 B1 | 3/2018 | Franklin et al. | |
| 2010/0185963 A1* | 7/2010 | Slik | G06F 16/1844 715/764 |
| 2014/0222866 A1* | 8/2014 | Joneja | G06F 16/168 707/785 |
| 2020/0159706 A1* | 5/2020 | Cheru | G06F 16/289 |
| 2020/0250132 A1* | 8/2020 | Ramsden | G06F 16/13 |
| 2020/0326872 A1* | 10/2020 | Miyoshi | G06F 3/0685 |

* cited by examiner

*Primary Examiner* — Tracy A Warren
(74) *Attorney, Agent, or Firm* — Knobbe, Martens, Olson & Bear, LLP (57) ABSTRACT

Systems and methods are provided for utilizing rules for placement of objects in storage in a manner that improves retrieval times relative to a default ordering utilized by an object storage system. For example, a request to store an object in a persistent storage of a data storage system may be received, metadata associated with the request may then be parsed to identify a signal for placement of the object within the persistent storage, and a rule may be identified for placement of objects associated with that signal, such as by indicating a desired grouping or ordering of objects associated with the signal. A particular storage location for the object may then be determined within the persistent storage based at least in part on the signal, the rule, and previously determined storage locations of one or more other data objects associated with the signal.

20 Claims, 5 Drawing Sheets

PLACEMENT OF DATA OBJECTS IN STORAGE FOR IMPROVED RETRIEVAL

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In addition to computational resources, data centers provide a number of beneficial other services to client devices. For example, data centers may provide data storage services configured to store data submitted by client devices, and enabling retrieval of that data over a network. A variety of types of data storage services can be provided, often varying according to their input/output (I/O) mechanisms. For example, block storage services may allow I/O based on modification to one or more defined-length blocks, in a manner similar to how an operating system interacts with local storage, and may thus facilitate virtualized disk drives usable, for example, to store an operating system of a virtual machine. Object storage services may allow I/O at the level of individual objects or resources, such as individual files, which may vary in content and length. For example, an object storage service may provide an interface compliant with the Representational State Transfer (REST) architectural style, such as by allowing I/O based on calls designating input data and a hypertext transport protocol request methods (e.g., GET, PUT, POST, DELETE, etc.) to be applied to that data. By transmitting a call designating input data and a request method, a client can thus retrieve the data from an object storage service, write the data to the object storage service as a new object, modify an existing object, and/or other operations.

BRIEF DESCRIPTION OF DRAWINGS

Embodiments of various inventive features will now be described with reference to the following drawings. The drawings are provided to illustrate example embodiments described herein and are not intended to limit the scope of the disclosure.

DETAILED DESCRIPTION

The proliferation of network computing and storage, as well as the attendant increase in the number of entities dependent on network computing and storage, has increased the importance of optimizing data performance and integrity on network computing and storage systems. Furthermore, capacity needs and costs of increasing quantities of data may be partly mitigated by the use of data storage devices or media that is considerably faster at sequential storage than random access storage, relative to other data storage devices. Accordingly, data storage services may offer varying levels of storage to their customers that each have different expectations or guarantees of retrieval times or throughput capacity for data access or destruction.

Generally described, aspects of the present disclosure relate to improved methods and systems for object storage that utilize explicit or implicit hints or indications from a customer or user who is requesting storage of particular objects in order to more efficiently place objects in storage relative to other objects that are likely to be accessed and/or destroyed in close time proximity to each other. For example, a request to store an object in a first storage class (such as a long term storage class for storing relatively less frequently accessed objects than another storage class of a data storage system) may be received, metadata associated with the request may then be parsed to identify a hint or signal for placement of the object within the first storage class, and a rule may be identified for placement of objects associated with that hint or signal, such as by indicating a desired grouping or ordering of objects associated with a particular signal. A particular storage location for the object may then be determined within the first storage class based at least in part on the signal, the rule, and concurrently or previously determined storage locations of one or more other data objects associated with the signal or associated hint.

In the above manner, for instance, a user who knows that objects having a particular tag or metadata value are likely to be accessed or destroyed together in the future may establish a rule indicating that the data storage system should store objects having that tag, value or signal in locations relative to each other that enable fast sequential reads of group of objects, rather than storing them in a default order utilized by the data storage system. For example, a default order for placement of objects (which may be overridden by a particular rule or placement scheme associated with a particular customer, as will be discussed herein) and which may be employed in some existing systems may be based on the order in which storage of the objects was requested, and may result in the objects associated with a given signal being scattered among other objects having different signal values and/or that were stored on behalf of different users or customers of the storage service.

Aspects of the present disclosure are particularly useful in association with storage classes for which sequential read and/or write access is significantly faster than random access relative to other types of data storage devices. As examples, such storage classes may include, but are not limited to, storage split across different removable media (such as optical media, tape media, and/or others), as well as hard disk drives that utilize shingled magnetic recording (SMR). For example, SMR drives and other dense hard drives may have limitations that require sequential writes or overwrites within particular zones (rather than drives allowing for greater random access speeds), for which bulk object access speeds or throughput may be improved according to aspects of the present disclosure. By grouping and/or ordering objects together that are likely to be retrieved together, object placement as described herein may cause a retrieval time of bulk retrieval of objects to be faster than if the objects were originally stored in accordance with a standard storage ordering utilized by existing data storage systems. Additional advantages provided by the present disclosure with respect to removable media further include that bulk retrieval of objects when stored as described herein may lower the overall wear and risk of failure across the different removable media and drive(s) because the media will generally need to be moved in and out of drives for access less often than according to alternative ordering of objects in storage (such as storing objects in the order they are received by the storage system).

While certain types of storage are mentioned above and elsewhere herein, it will be appreciated that the storage services described herein may rely on any of a variety of storage types, depending on the embodiment. For example, data storage devices utilized in certain embodiments may include any resource or collection of resources, such as those of a computing resource service provider, that are capable of storing data, and may be physical, virtual, or some combination of the two. For example, data storage devices may be data storage facilities, such as those housing a plurality of physical storage servers and/or other such entities. Other examples of data storage devices may include tapes (e.g., tape media), optical media (e.g., DVDs, Blu-Ray or others), magneto-optical media, hard disk drives, solid state drives, solid state media, memory resistor-based devices (e.g., memristors), and/or others. Data storage devices may include self-contained devices that include storage media and integrated electronics and other mechanisms for reading the media, or, in some embodiments, may include only the storage media itself (for which the system may rely on some external drive or other mechanism to retrieve data stored thereon).

Figure 1A:
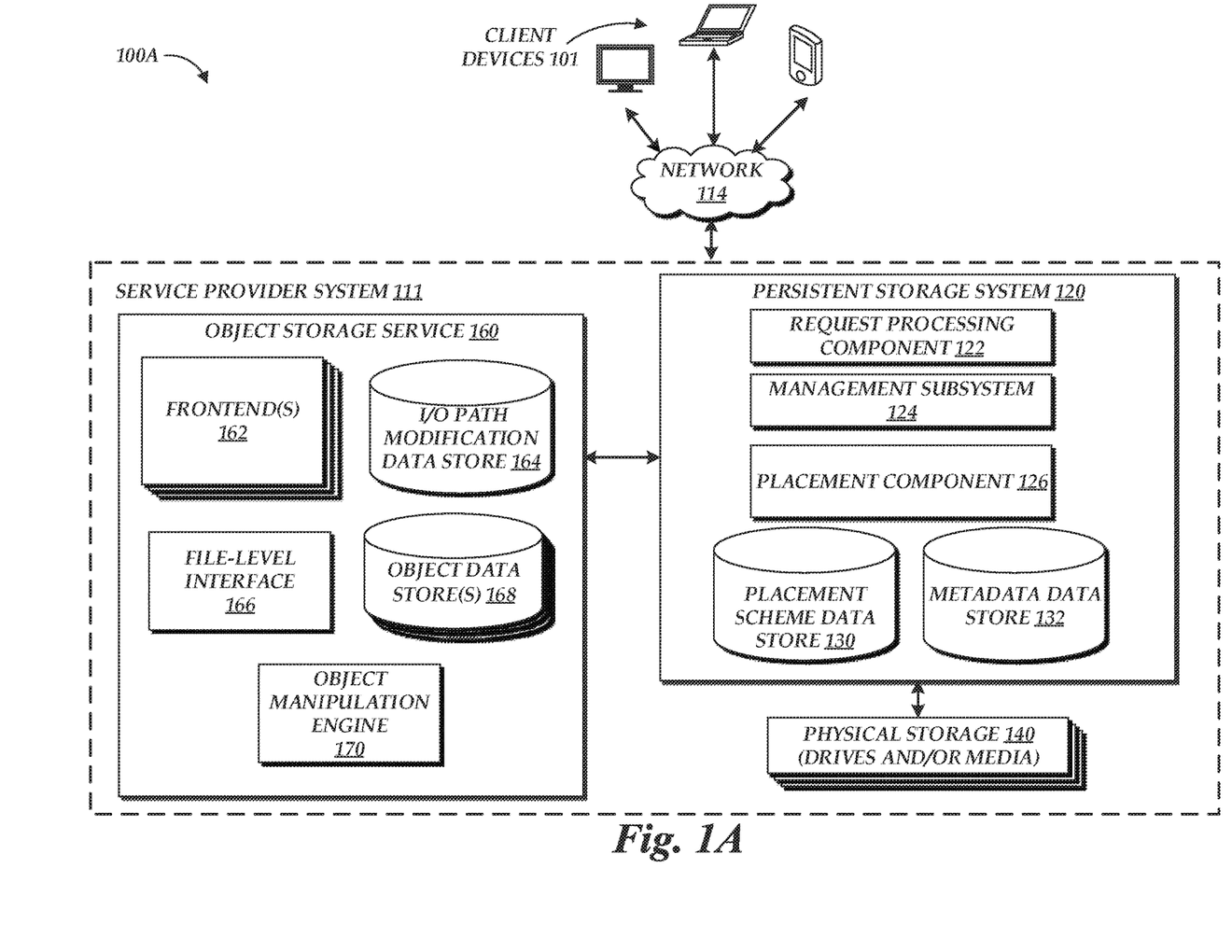
FIG. 1A is a block diagram of an illustrative operating environment in which a service provider system operates to enable client devices to store, retrieve and/or manipulate objects in one or more storage classes.

FIG. 1A is a block diagram of an illustrative operating environment 100A in which a service provider system 111 operates to enable client devices 101 to store, retrieve and/or manipulate objects in one or more storage classes, at least one class of which may be handled by persistent storage system 120. By way of illustration, various example client devices 101 are shown in communication with the service provider system 111, including a desktop computer, laptop, and a mobile phone. In general, the client devices 101 can be any computing device such as a desktop, laptop or tablet computer, personal computer, wearable computer, server, personal digital assistant (PDA), hybrid PDA/mobile phone, mobile phone, electronic book reader, set top box, voice command device, camera, digital media player, and/or other devices. These client device 101 may be operated by users who are each associated with one or more customers (which may each be an individual or an organization) that utilizes the service provider system 111 for storage of data, digital files, and/or data objects other than files. The service provider system 111 may be configured to store data on behalf of a potentially large number of different customers.

Generally described, the object storage service 160 can operate to enable clients to read, write, modify, and delete data objects, each of which represents a set of data associated with an identifier (an "object identifier" or "resource identifier") that can be interacted with as an individual resource. For example, an object may represent a single file submitted by a client device 101 (though the object storage service 160 may or may not store such an object as a single file). This object-level interaction can be contrasted with other types of storage services, such as block-based storage services providing data manipulation at the level of individual blocks or database storage services providing data manipulation at the level of tables (or parts thereof) or the like. The object storage service may store numerous data objects of varying sizes. Key-value data may be stored that associates data objects with identifiers of the data objects that may be used by a customer to retrieve or perform other operations in connection with the data objects stored by the service.

The object storage service 160 illustratively includes one or more frontends 162, which provide an interface (a command-line interface (CLIs), application programing interface (APIs), or other programmatic interface) through which client devices 101 can interface with the service 160 to configure the service 160 on their behalf and to perform I/O operations on the service 160. For example, a client device 101 may interact with a frontend 162 to create a collection of data objects on the service 160 (e.g., a "bucket" of objects) and to configure permissions for that collection. Client devices 101 may thereafter create, read, update, or delete objects within the collection based on the interfaces of the frontends 162. In one embodiment, the frontend 162 provides a REST-compliant Hypertext Transfer Protocol interface supporting a variety of request methods, each of which corresponds to a requested I/O operation on the service 160. By way of non-limiting example, request methods may include:

i) a GET operation requesting retrieval of an object stored on the service 160 by reference to an identifier of the object;

ii) a PUT operation requesting storage of an object to be stored on the service 160, including an identifier of the object and input data to be stored as the object;

iii) a DELETE operation requesting deletion of an object stored on the service 160 by reference to an identifier of the object; and/or iv) a LIST operation requesting listing of objects within an object collection stored on the service 160 by reference to an identifier of the collection.

A variety of other operations may also be supported. For example, the service 160 may provide a POST operation similar to a PUT operation but associated with a different upload mechanism (e.g., a browser-based HTML upload), a HEAD operation enabling retrieval of metadata for an object without retrieving the object itself, a COPY operation enabling copying of an object stored on the service 160 to another object, a SELECT operation enabling specification of an SQL query to be applied to an object prior to returning the contents of that object or prior to storing the modified object, and/or other operations.

During general operation, frontends 162 may be configured to obtain a call to a request method, and apply that request method to input data for the method. For example, a frontend 162 can respond to a request to PUT input data into the service 160 or persistent storage system 120 as an object by storing that input data as the object. Objects may be stored, for example, on object data stores 168, which correspond to any persistent or substantially persistent storage (including hard disk drives (HDDs), solid state drives (SSDs), network accessible storage (NAS), storage area networks (SANs), non-volatile random access memory (NVRAM), or any of a variety of storage devices known in the art). As a further example, the frontend 162 can respond to a request to GET an object from the service 160 by retrieving the object from the stores 168 (the object representing input data to the GET resource request), and returning the object to a requesting client device 102. In some embodiments, the object data stores 168 may be associated with a default or standard storage class offered to customers by the service 111, while persistent storage system 120 may provide another storage class for longer term backup, which may have lower costs and associated retrieval times.

In some cases, calls to a request method may invoke one or more native data manipulations provided by the service 160. For example, a SELECT operation may provide an SQL-formatted query to be applied to an object (also identified within the request), or a GET operation may provide a specific range of bytes of an object to be returned. The service 160 illustratively includes an object manipulation engine 170 configured to perform native data manipulations, which illustratively corresponds to a device configured with software executable to implement native data manipulations on the service 160 (e.g., by stripping non-selected bytes from an object for a byte-range get, by applying an SQL query to an object and returning results of the query, etc.).

In accordance with embodiments of the present disclosure, the service 160 can further be configured to enable modification of an I/O path for a given object or collection of objects, such that a called request method is applied to an output of a data manipulation function, rather than the resource identified within the call. For example, the service 160 may enable a client device 101 to specify that GET operations for a given object should be subject to execution of a user-defined task, such that the data returned in response to the operation is the output of a task execution rather than the requested object. Similarly, the service 160 may enable a client device 101 to specify that PUT operations to store a given object should be subject to execution of a user-defined task, such that the data stored in response to the operation is the output of a task execution rather than the data provided for storage by a client device 102. In some embodiments, a client device 102 may specify a pipeline or other data manipulation for an object or object collection through the frontend 162, which may store a record of the pipeline or manipulation in the I/O path modification data store 164, which store 164, like the object data stores 168, can represent any persistent or substantially persistent storage. While shown as distinct in FIG. 1, in some instances the data stores 164 and 168 may represent a single collection of data stores.

In some embodiments, the object storage service 160 may be configured to provide file-level access to objects stored on the data stores 168 and/or physical storage 140 of the persistent storage system. For example, the object storage service 160 can include a file-level interface 166 providing network access to objects of the service provider system 111 as files. The file-level interface 166 may, for example, represent a network-based file system server (e.g., a network file system (NFS)) providing access to objects as files.

The client devices 101, object storage service 160, and/or persistent storage system 120 may communicate via a network 114, which may include any wired network, wireless network, or combination thereof. For example, the network 114 may be a personal area network, local area network, wide area network, over-the-air broadcast network (e.g., for radio or television), cable network, satellite network, cellular telephone network, or combination thereof. As a further example, the network 114 may be a publicly accessible network of linked networks, possibly operated by various distinct parties, such as the Internet. In some embodiments, the network 114 may be a private or semi-private network, such as a corporate or university intranet. The network 114 may include one or more wireless networks, such as a Global System for Mobile Communications (GSM) network, a Code Division Multiple Access (CDMA) network, a Long Term Evolution (LTE) network, or any other type of wireless network. The network 114 can use protocols and components for communicating via the Internet or any of the other aforementioned types of networks. For example, the protocols used by the network 114 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The object storage service 160 and persistent storage system 120 are depicted in FIG. 1A as operating in a distributed computing environment including several computer systems that are interconnected using one or more computer networks. The object storage service 160 and persistent storage system 120 could also operate within a computing environment having a fewer or greater number of devices than are illustrated in FIG. 1A. Thus, the depiction of the object storage service 160 and persistent storage system 120 in FIG. 1A should be taken as illustrative and not limiting to the present disclosure. For example, the illustrated services and systems or various constituents thereof could implement various Web services components, hosted or "cloud" computing environments, or peer to peer network configurations to implement at least a portion of the processes described herein. In some instances, the object storage service 160 and persistent storage system 120 may be combined into a single service or computing system. Further, the object storage service 160 and persistent storage system 120 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

While some functionalities are generally described herein with reference to an individual component of the object storage service 160 or persistent storage system 120, other components or a combination of components may additionally or alternatively implement such functionalities. For example, while the persistent storage system 120 is depicted in FIG. 1A as including a placement component 126 (discussed below), functions of that component 126 may additionally or alternatively be implemented by the object storage service 160. Thus, the specific configuration of elements within FIG. 1A is intended to be illustrative.

As further illustrated in FIG. 1A, the service provider system 111 includes a persistent storage system 120. The persistent storage system 120 may provide one class of storage (such as long term, low cost storage relative to another class of storage provided by the object storage service, in one embodiment). The persistent storage system 120 may be configured to persistently store objects or other data that may be relatively infrequently accessed and for which relatively long retrieval times (compared to some other class of storage available to the customer) are acceptable to the customer.

In the illustrated embodiment, the persistent storage system 120 includes various subsystems or components, such as a request processing component 122, a management subsystem 124 and a placement component 126. The persistent storage system 120 may also include a metadata storage 132, which may store metadata about various data objects stored among the storage devices 140. In an embodiment, the request processing component 122 is a collection of computing resources, such as webservers and application servers, collectively configured to process requests submitted to the persistent storage system 120, which may be received from a client device (either directly or indirectly via the object storage service 160) or from the object storage service 160 (such as based on an automated migration of objects from shorter term storage to longer term storage). The request processing component 122 may include computers systems configured to make various determinations in connection with the processing of requests, such as whether policy allows fulfillment of a request, whether requests are authentic (e.g., electronically signed using a suitable cryptographic key) and otherwise.

Components of the request processing subsystem may interact with other components of the service provider system 111 (e.g., through network communications). For example, some requests submitted to the request processing component 122 may involve the management of computing resources which may include data objects stored by the persistent storage system 120. The request processing component 122, for example, may receive and process requests to modify computing resources. For instance, in some examples, data objects are logically organized into logical data containers. Data objects associated with a logical data container may, for example, be said to be in the logical data container. Requests to the data processing component 122 may include requests for creating logical data containers, deleting logical data containers, providing an inventory of a logical data container, providing or updating access control policy with respect to one or more logical data containers and the like.

The requests may be processed by the management subsystem 124 upon receipt by the request processing component 122. If applicable, various requests processed by the request processing component 122 and/or management subsystem 124, may result in the management subsystem updating metadata associated with data objects and logical data containers stored in the metadata store 132. Other requests that may be processed by the request processing component include requests to perform operations in connection with data objects. The requests, for example, may include requests to upload data objects, to download data objects, or to delete data objects from physical storage 140.

The placement scheme data store 130 may store various rules that describe, on a customer-specific basis (in some embodiments), placement schemes for arrangement (e.g., grouping, ordering, etc.) of objects in storage based on hints or signals identified in metadata for the respective objects. As will be discussed further herein, the placement component 126 may effectively override a default storage ordering implemented by the persistent storage system 120 when a specific rule in implicated by a given object storage request. As discussed above, the default storage order for objects (absent any contrary rule being applicable, as discussed herein) may be that objects are sorted according to the customer and the time of upload and/or receipt of the object by the storage service.

In some embodiments, the objects may be stored at particular determined locations in physical storage 140, as will be further described below. For example, the object data may be stored as a plurality of shards across a plurality of volumes, the quantity of which (either shards or volumes, which in some cases may have a one to one relationship) may be predetermined according to various factors, including the minimum number of total shards sufficient to reconstruct the original data using a redundancy code. An index may be stored for each volume which reflects what is stored on the given volume. The storage system may employ various features such as sparse indexes, redundancy, failure de-correlated volume cohorts, and regeneration/recovery processes described in U.S. Pat. No. 9,923,966. In certain embodiments, the physical storage 140 may include removable media, as will be described below with respect to FIG. 1B.

Figure 1B:
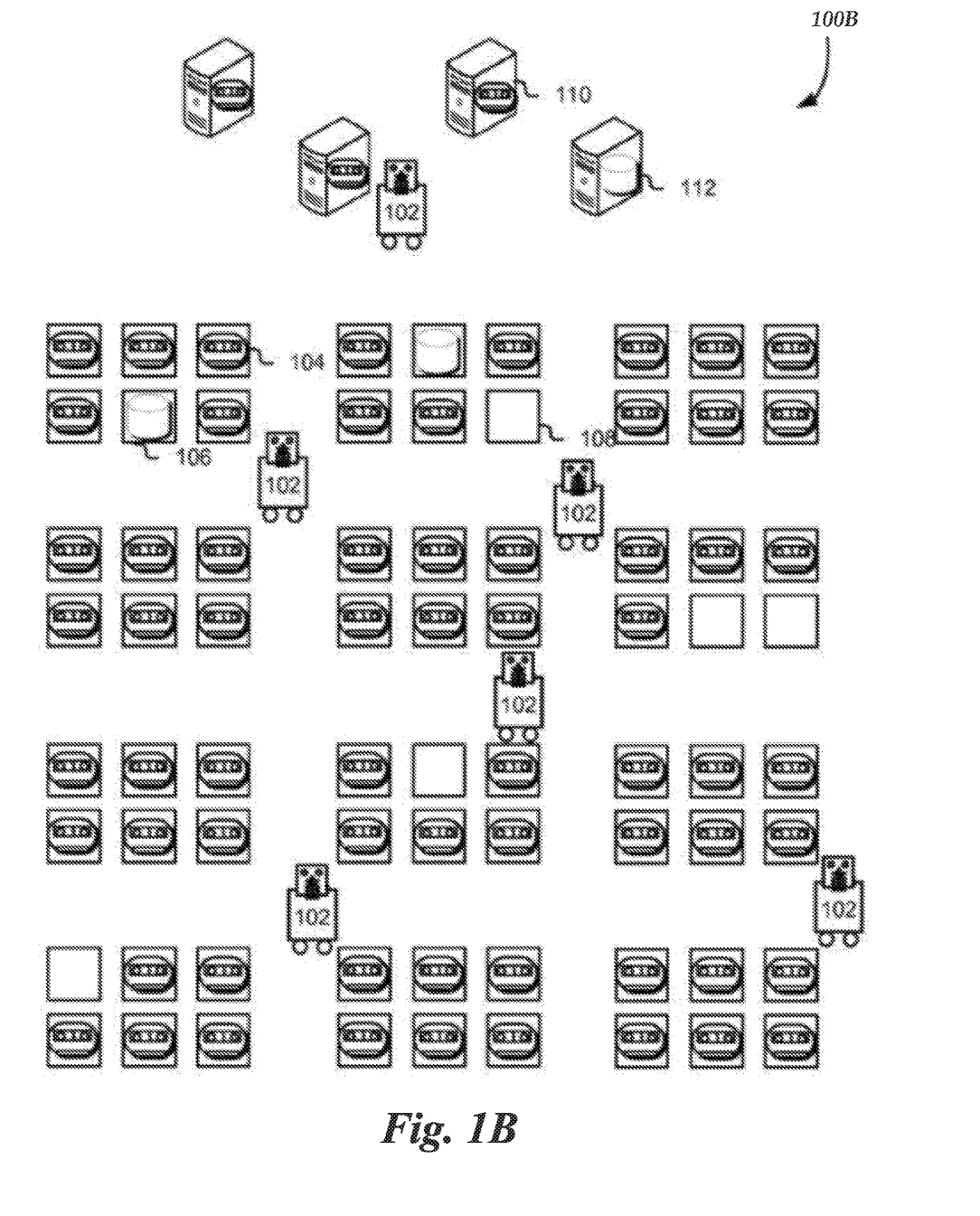
FIG. 1B schematically illustrates an environment for implementing physical storage of data storage devices using inventory holders, in accordance with some embodiments.

FIG. 1B schematically illustrates an environment for implementing physical storage of data storage devices using inventory holders, in accordance with some embodiments. In some embodiments, a data storage system 100B may store, organize, and access data storage devices (e.g., which may store shards associated with archives, in some cases on a one to one basis) using mobile drive units 102. Data storage system 100B may be one example of an arrangement of physical storage depicted as physical storage 140 in FIG. 1A. While the particular embodiment of physical storage depicted in FIG. 1B will be briefly described below, more details for the system architecture and associated functionality is described in co-owned U.S. Pat. No. 9,923,966, entitled "Flexible Media Storage and Organization in Automated Data Storage Systems," which is hereby incorporated by reference in its entirety herein.

The mobile drive units 102 may be any entity that is electronically controllable, such as by an automated system, and which is capable of engaging objects (such as by lifting them) such as inventory holders, and mobilizing them toward a destination, such as a device data station. The mobile drive units 102, in embodiments where multiple mobile drive units 102 are implemented, may differ in various characteristics, such as physical dimensions, load capacity, tray configuration, and the like, relative to other mobile drive units 102 in the same system. The mobile drive units 102, as well as other components, techniques, and systems mentioned and described herein, in some embodiments have other capabilities and characteristics described in U.S. Pat. Nos. 7,873,469, 7,894,932, 8,725,286, 7,402,018, 8,831,984, 8,972,045, and 9,923,966, each of which are hereby incorporated by reference in their entirety herein.

In such embodiments, the data storage devices may be allocated to, and stored in, freely placed and placeable inventory holders 104. The inventory holders 104 may be any device, such as a storage unit, capable of holding inventory, such as data storage devices, in a structured or unstructured fashion. The inventory holders 104 may include a number of components that organize, separate, and/or secure the contents therein. Examples of such components may include trays, which may in some cases be vertically stacked, horizontally arranged, or otherwise arranged, that hold inventory (e.g., data storage devices), in a fashion that enables other entities to access and/or view them from some position, such as vertically from above, from the side (horizontally), or some combination thereof. As with the mobile drive units 102, the inventory holders 104, as well as other functionalities described herein, may have other capabilities and characteristics described in the prior patents mentioned above.

In some embodiments, the inventory holders 106 may hold different types of data storage devices relative to other inventory holders 104, and, in some embodiments, a given inventory holder 104 may hold a heterogeneous mix of two or more types of data storage devices. Data storage devices may be of any suitable type for storing data, and may be differentiated on one or more of a number of characteristics, including durability, performance, data standard, media standard (e.g., tape device standards), physical dimensions and/or configuration, age (either of the data storage device or data contained therein), data type, and the like.

In response to a request for data, e.g., to write, read, move, copy, destroy or otherwise manipulate data associated with one or more data storage devices, the data storage system 100 may determine which data storage devices to retrieve in accordance with the request. The data storage system may further determine the location of one or more of the inventory holders 104 or/or 106 storing the determined data storage devices, and, using an available mobile drive unit 102, cause retrieval of those inventory holders 104 and/or 106 so as to place them in proximity of an appropriate device data station 110 or 112.

The device data station 110 or 112 may be any device or other component capable of reading one or more types of data storage devices stored on the inventory holders 104 and/or 106. For example, the device data station may include one or more physical readers (e.g., tape drives, optical drives, data ports, and the like) that allow transaction of data between the data storage device and other portions of the data storage system, and eventually, a customer of the data storage system. In some embodiments, a given device data station 110 may be configured to read one specific type of data storage device. In some embodiments, a given data station 110 may be configured to read multiple types of data storage devices.

A device retrieval unit associated with (e.g., attached to and/or controlled by) the device data station 110 and/or 112 selects or "picks" the appropriate data storage devices in accordance with the request and manipulates the selected data storage devices so as to enable the device data station 110 and/or 112 to read and/or write the requisite data to or from the data storage devices in accordance with the data request. In some embodiments, the particular data storage device on which to store a given object may be determined by the placement component 126, as will be further described below.

After a data operation is complete, the data storage devices may be returned to the same or different inventory holder 104 or 106 from which they were retrieved, and once the inventory holder is loaded and marked for storage, the inventory holder is relocated, such as by a mobile drive unit (which may be the same or different than the one that retrieved the inventory holder in the first instance), to a location where the mobile drive unit may perform further retrieval operations in accordance with further data requests. In some embodiments, that location may be spare area 108, whether temporarily or permanently. As may thus be contemplated, the layout of the inventory holders 104 and 106 may be dynamic, in that it may change over time, usage, and/or access. In some embodiments, however, the layout may be fixed, or semi-fixed, and the layout may change only periodically, or as a result of a manual process (such as setting of predetermined configurations of inventory holders).

Figure 2:
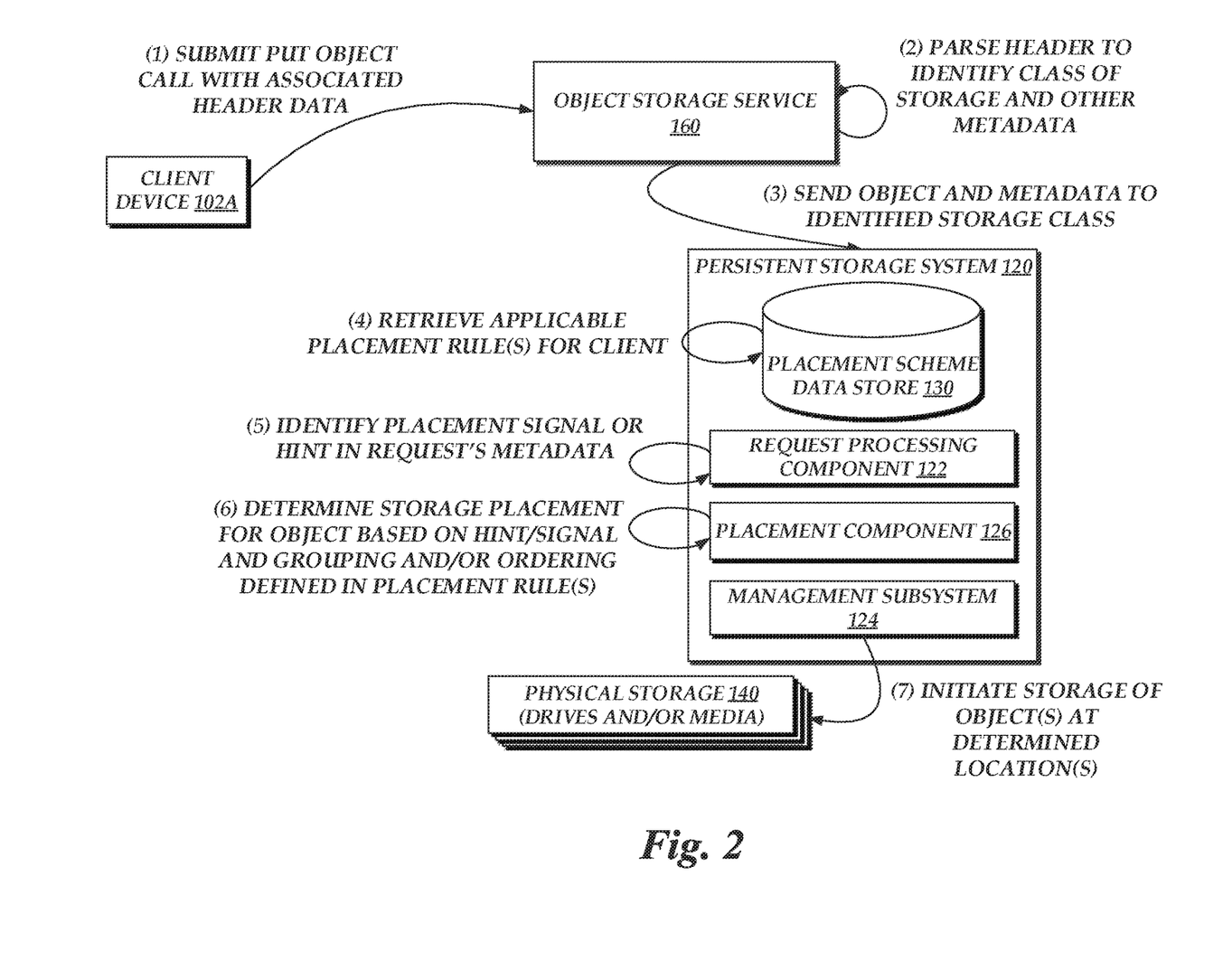
FIG. 2 depicts an illustrative data flow for handling a request to store input data as an object in persistent storage in accordance with a previously established placement rule, according to some embodiments.

FIG. 2 depicts an illustrative data flow for handling a request to store input data as an object in long term storage in accordance with a previously established placement rule, according to some embodiments. Illustrative interactions will be discussed below for storing an object by the object storage service 160, which request is referred to in connection with these figures as a "PUT" request or "PUT object call." However, it will be appreciated that the object storage request may be submitted in other manners in other embodiments, such as via an application programming interface (API).

The interactions of FIG. 2 begin at (1), where a client device 102A submits a PUT object call to the storage service, corresponding to a request to store input data (e.g., data included or specified within the call) by the service 160. The input data may correspond, for example, to a file stored on the client device 102A. The call may be directed to a frontend 162 of the service. An I/O path for a call may generally be specified with respect to a request method included within a call, an object or collection of objects indicated within the call, a specific mechanism of reaching the service 160 (e.g., protocol, URI used, etc.), an identity or authentication status of the client device 102, or a combination thereof. For example, the I/O path used can correspond to use of a PUT request method directed to a particular URI (e.g., associated with the frontend 162) to store an object in a particular bucket or other logical storage portion on the service 160 associated with the particular requesting customer.

The PUT request may include header information that includes metadata associated with the object or file. In some embodiments, the header information may include a particular storage class desired by the customer for the particular object. For example, the object storage service 160, in some embodiments, may include three tiers of storage classes: (1) one or more storage classes for frequently accessed objects, (2) one or more storage classes that automatically optimize frequently and infrequently accessed objects, and (3) one or more long term storage classes for infrequently accessed objects (which may include storage classes designed for low-cost data archiving). When creating a new object, the customer may specify its storage class, such as by including an enumerated value that identifies the class. For example, the PUT object request received at step (1) in FIG. 2 may include a storage class request header to specify a storage class.

Other than specifying the storage class, the header information in the request may include other metadata such as a hostname, bucket, date, authorization string, content length, and content type. Additionally, the user may specify one or more tags or user-defined metadata values. A tag and/or user-defined metadata entry may, for example, be in the header information in the form of a string that includes one or more key-value pairs created by the customer (such as in the form "tagging: tag1=value1&tag2=value2").

Next, at step (2), the object storage service 160 may parse the header to identify the desired storage class for the object, as well as other metadata included in the header. In the given example, it will be assumed that the user has specified, in the header information, that a long term (infrequently accessed) storage class should be utilized for storage of the given object that is subject to the request. Accordingly, the object storage service may pass the object data and associated metadata from the header to the persistent storage system 120 and step (3).

At step (4), the persistent storage system 120 may receive the object storage request and retrieve one or more placement rules associated with an account of the particular client or customer. For example, the persistent storage system 120 may store objects on behalf of a number of different customers (each of which may in turn separate their individual objects among a number of different buckets), and placement schemes or rules may be set differently for each customer. Accordingly, placement scheme data store 130 may store one or more placement rules for each of a number of different customer accounts, and the applicable rule(s) for the given request may be retrieved at step (4). In some embodiments, the retrieved rule may be based on a customer identifier, and optionally narrowed to be specific to one or more additional pieces of metadata in the request.

For example, in some embodiments, a rule may be specific to a certain combination of customer, bucket and tag. Such a rule may indicate, for example, that for a specific customer within a specific bucket, objects should be grouped in storage in order to keep objects that have a certain tag in physical proximity to each other because they are likely to be later requested for retrieval or destruction at the same time as each other. For example, if a customer uploads files that are each tagged with a number of different tags (such as each being tagged as one or more of four different tags— tag1, tag2, tag3, tag4), the customer may have established rules indicating that for a certain subset of objects (such as having a first object name prefix), those objects should be grouped according to tag2. The customer may have established this rule knowing that the customer would be likely to later submit a bulk request to either retrieve, destroy or manipulate objects associated with that prefix and tag2.

In some embodiments, the rules may have previously been manually set by the customer (such as by submitting a script or code specifying the rule parameters, or making selections via a user interface to build a rule based on selection of tags, prefixes or metadata values, along with logical operators). In other embodiments, the service provider system 111 may automatically generate the rules for a particular customer based on an automated analysis of prior requests to access data objects associated with the customer's account. For example, a machine learning model may have been trained to analyze prior object retrieval requests associated with the customer's account in order to identify metadata values that are shared between objects that tend to be jointly requested for retrieval (or requested for retrieval in close time proximity to each other). The service provider system 111 may thus have determined that objects sharing those metadata values should be stored near each other to improve retrieval times for future retrieval requests, and an associated rule may then have been generated and stored in the placement scheme data store 130.

At step (5), the request processing component 122 may identify a placement signal or hint in the request's metadata. In one embodiment, for example, a number of different potentially applicable placement rules may be associated with the customer's account. Some of the rules may indicate a specific signal (such as a particular metadata value) from which objects should be stored in a certain order (such as reverse chronological order). Other rules may rely on implicit hints that can be present in metadata, and which may be based on a combination of object name prefixes, content type, creation date, end user identifier, one or more tags, and/or other metadata. Step (5) may include identifying the signal(s) or hint(s) in the metadata to which the applicable rule will be applied in determining placement for the object.

Next, at step (6), the placement component 126 may determine the storage placement for the object based on the hint (or signal) and the grouping and/or ordering defined in the applicable placement rule. For example, if the rule indicates that objects associated with "tag2" should be stored sequentially in reverse chronological order, determining the placement may include identifying a last stored location of a previously stored object with the "tag2" tag, and selecting the next available write location in physical proximity to that location at which to store the new object. Once a specific placement is determined, the management subsystem 124 may initiate storage of the object (potentially in addition to storing other objects being grouped together) in physical storage 140 at the determined location(s), at step (7). The placement determination and subsequent storage will be described in more detail below with respect to FIG. 3.

Figure 3:
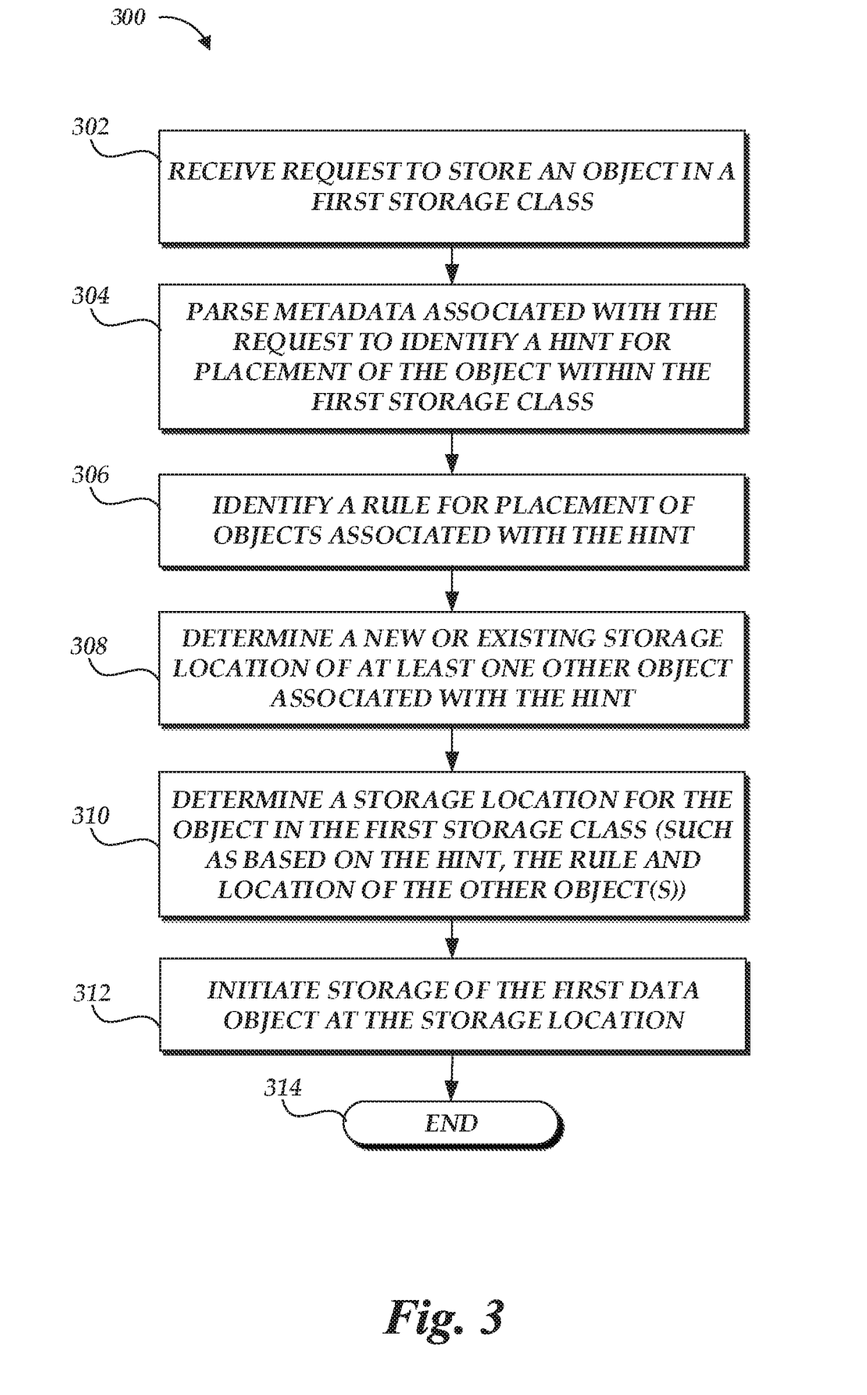
FIG. 3 is a flow diagram illustrating an example process for storing a data object at a storage location determined based on the object's metadata and at least one placement rule.

FIG. 3 is a flow diagram illustrating an example process 300 for storing a data object at a storage location that is determined based on the object's metadata and at least one placement rule. The illustrative method may be implemented by the service provider system 111. For example, in one embodiment, the illustrative method may be implemented entirely by the persistent storage system 120, while in other embodiments the method may be implemented in whole or in part by the object storage service 160.

The illustrative method 300 begins at block 302, where the service provider system 111 receives a request to store a data object in a first storage class, such as a storage class of the persistent storage system 120. As discussed above with respect to FIG. 2, the request may be in the form of an HTTP PUT object call originating from a client device. In other embodiments, the request may be automatically generated by the object storage service, such as a batch migration process to move objects from a short term storage class to a long term storage class (referenced as the first storage class in FIG. 3) after a certain time period (such as 30 days) in which the objects have not been requested or accessed by the customer. In still other embodiments, the request may be a request to reorganize or rearrange stored objects relative to one another, such as based on a new placement scheme that a customer would like to implement or based on an administrative garbage collection process (such as to address section of media with removed content, in order to make the space usable) or a storage optimization process. Such rearrangement of objects on removable media may include first copying the objects to temporary storage and then overwriting the media with new object arrangements.

At block 304, the service provider system 111 may parse metadata associated with the request to identify a hint or signal for placement of the object within the first storage class. As discussed above with respect to FIG. 2, this block may include parsing header information associated with a PUT request, in some embodiments. In other instances, such as part of a migration of an object between storage classes, the metadata may be retrieved from a data store, such as metadata data store 132 or object data store 168. Identification of a placement hint has been described above, such as with respect to FIG. 2. In some embodiments, the hint may include one or more of: a portion of the object name (such as a prefix in a string in the form of "prefix/objectname"), a user-defined metadata value (such as in a key-value pair) or a user-defined tag. While the portion of the object name may, in some embodiments, be a prefix portion of a string that appears to be similar to a file path, this may simply be a file naming convention used by a particular customer, and is independent of any file structure that may be used in association with object storage by the service provider system 111 (which may not employ any directory tree hierarchy or similar structure). The service provider system 111 may also (either prior to or after identifying one or more hints or signals in the metadata) identify a rule for placement of objects associated with the hint, as discussed above, which is illustrated as occurring at block 306.

At block 308, the placement component 126 may determine a new or existing storage location within the first storage class of at least one other object associated with the at least one hint. In some embodiments, such as when the storage request is to store a single object, this may include determining where in storage a last-stored object (such as a last object in a sort order specified in the rules based on the identified signal in the object's metadata) is currently placed in storage 140. In other instances in the same or different embodiments, such as in a bulk operation in which multiple objects are requested for storage in a batch process, block 308 may include determining where a plurality of objects in the request should be stored relative to each other based on their respective hints or key values specified in one or more of the applicable placement rules. For example, such a bulk storage operation may occur in instances in which objects are initially stored as part of a staging process in either object data store(s) 168 or a local short term data store of the persistent storage system 120 until a sufficient amount of data has been received to fill available space on one or more removable media or other portions of storage of physical storage 140. In this example, objects may be stored in a temporary location until the persistent storage system 120 is able to group sufficient related objects (such as objects determined to be related based on a placement scheme) into a grid or other target size or length of sequential data (which may correspond to the size of an individual instance of removable media in physical storage 140). In some instances in which the currently applied rule and/or the associated hint or signal are not related to any other object that has been requested for storage by the customer, block 308 may be skipped.

Once a storage location relative at least one other object (either previously stored or being stored in the same bulk or batch storage process) is determined, the method proceeds to block 310 to determine the actual physical location at which to store the data of the object, such as a location or byte range within a particular drive and/or media in storage 140. This may include determining respective locations for a plurality of objects in a given sort order, where the exact locations are based on an analysis of index data regarding objects previously stored on the storage 140, available storage space on various drives or media, file size metadata for the new object(s), and the combination of the applicable placement rule(s) and relevant object metadata values associated with the rule(s), as discussed above. As discussed above, the one or more applicable rules may be associated with one or more specific hints or signals identified in the object's metadata (e.g., a rule to store objects in a sort order from their numeric value for a certain key-value pair des-ignated in the rule), and/or may also additionally or alternatively have a time-based component (e.g. a rule indicating that for objects tagged with the tag "tag8," group the objects together or near each other in reverse chronological order).

In some embodiments, a rule may specify that an object should be stored two or more times in different sort orders or different proximities to other objects. For example, if a customer expects that they will often request retrieval of (or run operations or data manipulations on) objects in a bucket based on either a "user_identifier" metadata value (e.g., requesting all of a certain user's data) or an "event_identifier" metadata value (e.g., requesting all objects associated with some event across many users), the customer may have established a rule indicating that one area of storage should store each user's objects in close proximity to one another, while another area of storage should store each event's objects in close proximity to one another (and perhaps in a certain relative order, such as chronological order of an event date of the given event indicated in the object's metadata), such that at least some individual objects may be stored twice to allow for future sequential read access in either case.

At block 312, the persistent storage system 120 may initiate storage of the data object(s) at the determined storage location(s). In some embodiments, this may include operations described with respect to FIG. 1B above. For example, the object may be stored as a new object on the same removable media on which the at least one other data object (identified at block 308) is stored or on another removable media that is in close physical proximity to the first storage media on which the at least one other data object is stored. As discussed above, in some embodiments, storing the object at a specific location may include physically moving, via one or more automated mobile drive units, at least one of (a) an individual instance of removable media determined by the placement component 126 or (b) a drive configured to write to the determined removable media. For example, initiating the storage may include causing an automated mobile drive unit to physically retrieve the selected instance of removable media for write access by the drive, then writing data of the object at a selected location on the removable media instance. There may be advantages with respect to write speed for a bulk storage process (in addition to later retrieval speeds or restore throughput speed) by writing a number of objects in a single batch process in sequential order relative to one another, such as by waiting to initiate the writes until multiple objects are ready to be sequentially stored. Once the object(s) are stored, the illustrative method 300 ends at block 312.

Figure 4:
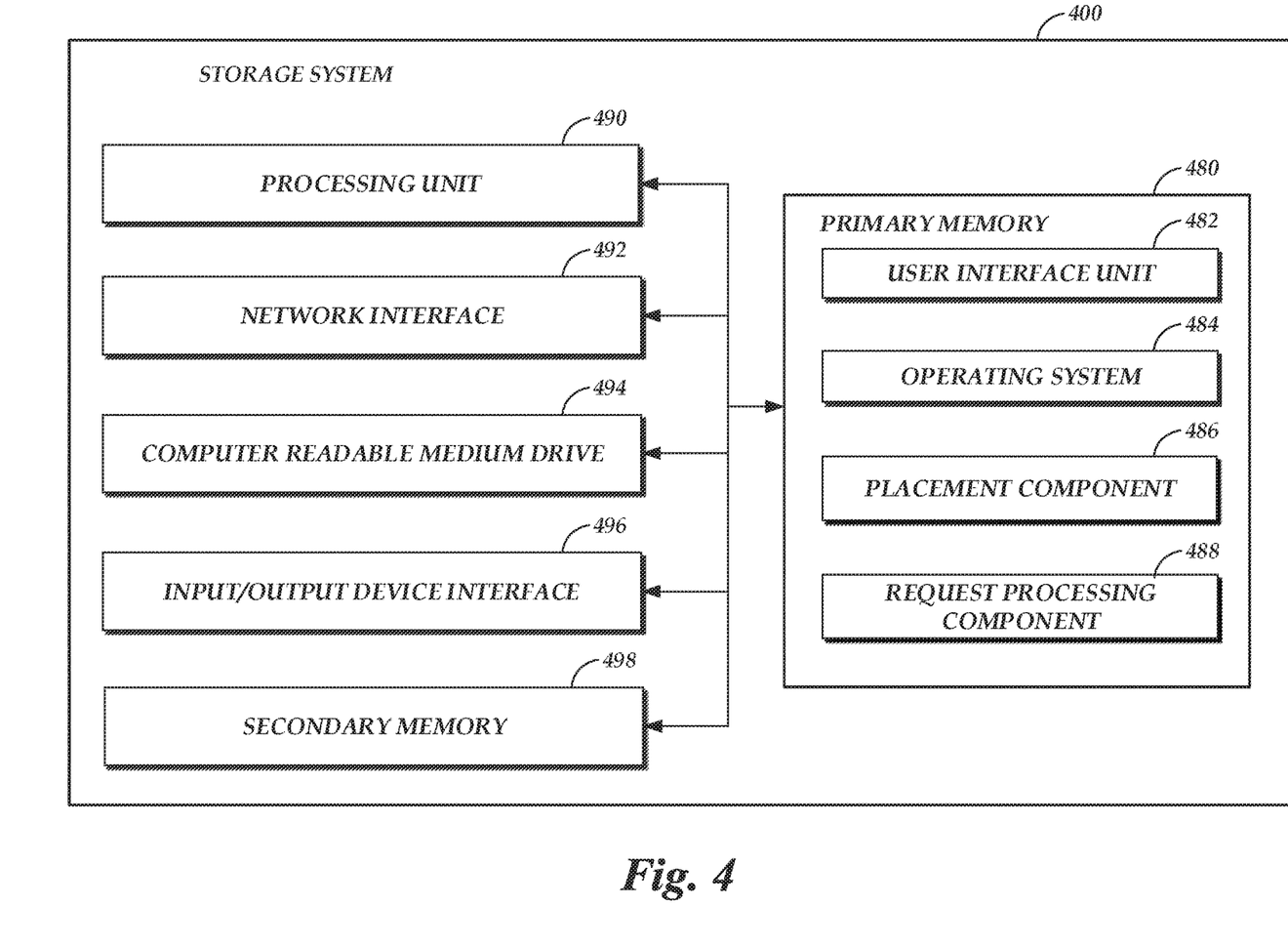
FIG. 4 is a block diagram depicting an illustrative architecture for a computing system that may implement one or more of the features described herein.

FIG. 4 depicts a general architecture of a computing system, illustrated as storage system 400, for implementing various aspects of the present disclosure. For example, storage system 400 may be an example of the persistent storage system 120 described above, according to some embodiments. The general architecture of the storage system depicted in FIG. 4 includes an arrangement of computer hardware and software that may be used to implement aspects of the present disclosure. The hardware may be implemented on physical electronic devices, as discussed in greater detail below. The storage system 120 may include many more (or fewer) elements than those shown in FIG. 4. It is not necessary, however, that all of these generally conventional elements be shown in order to provide an enabling disclosure. Additionally, the general architecture illustrated in FIG. 4 may be used to implement one or more of the other components illustrated in FIG. 1A, such as object storage service 160.

As illustrated, the storage system 400 includes a processing unit 490, a network interface 492, a computer readable medium drive 494, and an input/output device interface 496, all of which may communicate with one another by way of a communication bus. The network interface 492 may provide connectivity to one or more networks or computing systems. The processing unit 490 may thus receive information and instructions from other computing systems or services, such as via a network. The processing unit 490 may also communicate to and from primary memory 480 or secondary memory 498 and further provide output information for an optional display (not shown) via the input/output device interface 496. The input/output device interface 496 may also accept input from an optional input device (not shown).

The primary memory 480 or secondary memory 498 may contain computer program instructions (grouped as units, modules or components in some embodiments) that the processing unit 490 executes in order to implement one or more aspects of the present disclosure. These program instructions are shown in FIG. 4 as included within the primary memory 480, but may additionally or alternatively be stored within secondary memory 498. The primary memory 480 and secondary memory 498 may correspond to one or more tiers or classes of memory devices, including (but not limited to) RAM, 3D XPOINT memory, flash memory, magnetic storage, and/or others. The primary memory 480 is assumed for the purposes of description to represent a main working memory of the system 400, which may have a higher speed but lower total capacity than secondary memory 498.

The primary memory 480 may store an operating system 484 that provides computer program instructions for use by the processing unit 490 in the general administration and operation of the system 400. The memory 480 may further include computer program instructions and other information for implementing aspects of the present disclosure. For example, in one embodiment, the memory 480 includes a user interface unit 482 that generates user interfaces (or instructions therefor) for display upon a computing device, e.g., via a navigation or browsing interface such as a browser or application installed on the computing device. In addition to or in combination with the user interface unit 482, the memory 480 may include a placement component 486 and request processing component 488 (such as previously described above), that are each executable to implement aspects of the present disclosure described previously.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or one or more computer processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

The invention claimed is:

1. A system comprising:
   a non-transitory data store configured to store rules related to placement schemes for storing objects within a data storage system, wherein the data storage system stores data for each of a plurality of accounts using account-specific sets of rules, such that different placement schemes are used for some accounts than for other accounts of the plurality of accounts to store objects in physical storage shared by the plurality of accounts; and at least one computing device configured with computer-executable instructions that, when executed, cause the at least one computing device to:

receive a request to store a first data object in a first storage class of the data storage system, wherein sequential access to data within the first storage class is faster than random access to data within the first storage class, wherein the request is associated with a first account of the plurality of accounts, wherein the plurality of accounts utilize the first storage class of the data storage system for object storage;

retrieve, from the non-transitory data store, using an account identifier associated with the request, a rule for placement of objects associated with the first account, wherein the rule identifies one or more characteristics of objects likely to be accessed from the first storage class in close time proximity to each other in the future;

parse metadata associated with the request to identify a hint for placement of the first data object within the first storage class, where the hint relates to the one or more characteristics identified in the rule and includes one or more of: a portion of an object name, a user-defined metadata value, or a user-defined tag;

determine a previously selected storage location within the first storage class of at least one other data object other than the first data object, wherein the at least one other data object is associated with both the first account and the hint;

determine a storage location for the first data object within the first storage class based at least in part on (a) the hint, (b) the rule for placement of objects associated with the hint, and (c) the previously selected storage location of the at least one other data object; and initiate storage of the first data object at the storage location, wherein the storage location comprises a particular drive or particular removable media.

2. The system of claim 1, wherein the computer-executable instructions further cause the at least one computing device to, subsequent to the first data object being stored at the storage location:

initiate a retrieval of both the first data object and at the least one other data object associated with the hint, wherein placement of the first data object at the storage location based on the rule causes a retrieval time of the retrieval to be faster than if the first data object had been stored in accordance with a default storage ordering utilized by the data storage system for the first storage class.

3. The system of claim 1, wherein the first storage class of the data storage system comprises a plurality of instances of removable media, wherein read and write access to an individual instance of removable media is accomplished via physically moving, via one or more automated mobile drive units, at least one of (a) the individual instance of removable media or (b) a drive configured to write to the removable media.

4. The system of claim 3, wherein the computer-executable instructions are further configured to cause the at least one computing device to:

select at least one instance of removable media from among the plurality of instances of removable media; and cause an automated mobile drive unit to physically retrieve the at least one instance of removable media for write access by the drive.

5. A computer-implemented method comprising:

storing, for each of a plurality of accounts for which data objects are stored in persistent storage of a data storage system, a respective set of one or more rules for placement of data objects, such that different object placement schemes are specified for at least some of the accounts than for other accounts for storing data objects on a common set of persistent storage devices;

receiving a request to store a first data object in persistent storage of a data storage system, wherein the request is associated with a first account of the plurality of accounts;

parsing metadata associated with the request to identify a signal for placement of the first data object within the persistent storage, where the signal is one or more of: a portion of an object name, a user-defined metadata value, or a user-defined tag;

identifying a rule for placement of objects associated with the signal, wherein the rule indicates an arrangement, within the persistent storage, of objects associated with the signal, wherein identifying the rule comprises using an account identifier associated with the first account to retrieve the rule;

determining a previously selected storage location within the persistent storage of at least one other data object other than the first data object, wherein the at least one other data object is associated with both the first account and the signal;

determining a storage location for the first data object within the persistent storage based at least in part on (a) the signal, (b) the rule for placement of objects associated with the signal, and (c) the previously selected storage location of the at least one other data object; and initiating storage of the first data object at the storage location.

6. The computer-implemented method of claim 5, wherein the at least one other data object has been stored in the previously selected storage location prior to receiving the request to store the first data object, and wherein the storage location for the first data object is selected to be on at least one of (a) first storage media on which the at least one other data object is stored or (b) second storage media that is in close physical proximity to the first storage media on which the at least one other data object is stored.

7. The computer-implemented method of claim 5, wherein the at least one other data object has not yet been stored in the previously selected storage location prior to receiving the request to store the first data object, and wherein initiating storage of the first data object at the storage location further includes initiating storage of the at least one other data object in proximity to the first data object based on the rule.

8. The computer-implemented method of claim 5 further comprising, subsequent to the first data object being stored at the storage location, initiating a retrieval of both the first data object and at the least one other data object associated with the signal, wherein placement of the first data object at the storage location based on the rule causes a retrieval time of the retrieval to be faster than if the first data object had been stored in accordance with a standard storage ordering utilized by the data storage system for the persistent storage.

9. The computer-implemented method of claim 5 further comprising, prior to receiving the request to store the first data object, generating the rule based at least in part on an automated analysis of prior requests to access data objects associated with the first account.

10. The computer-implemented method of claim 5, wherein the rule is defined by a user associated with the first account prior to the request to store the data object.

11. The computer-implemented method of claim 5, wherein the request is associated with a bulk request to rearrange a plurality of data objects stored in association with the first account in order to place data objects in relation to each other in a manner that improves retrieval throughput based on expected future data object access patterns for the first account.

12. The computer-implemented method of claim 5, wherein the rule indicates that data objects associated with the signal should be stored in reverse chronological order from a particular data object stored in association with the signal.

13. The computer-implemented method of claim 5, wherein the rule indicates that multiple data objects associated with the signal are likely to be accessed or destroyed together in association with a future multi-object request.

14. Non-transitory computer readable media including computer-executable instructions that, when executed by a computing system, cause the computing system to perform operations comprising:

storing, for each of a plurality of accounts for which data objects are stored in persistent storage of a data storage system, a respective set of one or more rules for placement of data objects, such that different data object placement schemes are specified for at least some of the accounts than for other accounts for storing data objects on a common set of persistent storage devices;

receiving a request to store a first data object in the persistent storage of the data storage system;

parsing metadata associated with the request to identify a signal for placement of the first data object within the persistent storage;

identifying a rule for placement of objects associated with the signal, wherein the rule indicates at least one of a grouping or ordering of objects associated with the signal, wherein identifying the rule comprises using an account identifier associated with the request to retrieve the rule;

determining a previously selected storage location within the persistent storage of at least one other data object other than the first data object, wherein the at least one other data object is associated with the signal;

determining a storage location for the first data object within the persistent storage based at least in part on (a) the signal, (b) the rule for placement of objects associated with the signal, and (c) the previously selected storage location of the at least one other data object; and     initiating storage of the first data object at the storage location.

15. The non-transitory computer readable media of claim 14, wherein the persistent storage is a first storage class of the data storage system, and wherein the request is to transfer the first data object from a second storage class to the first storage class, wherein random access to data objects in the second storage class is faster than random access to data objects in the first storage class.

16. The non-transitory computer readable media of claim 14, wherein the request comprises a Hypertext Transfer Protocol (HTTP) PUT operation requesting storage of the first data object, wherein the metadata is included in header information associated with the HTTP PUT operation.

17. The non-transitory computer readable media of claim 14, wherein the persistent storage of the data storage system utilizes a plurality of removable storage media for data object storage, wherein determining the storage location for the first data object comprises selecting one of the plurality of removable storage media on which to store the first data object.

18. The non-transitory computer readable media of claim 14, wherein the persistent storage of the data storage system utilizes at least one shingled magnetic recording (SMR) drive for data object storage.

19. The non-transitory computer readable media of claim 14, wherein the operations further comprise causing the computing system to, subsequent to the first data object being stored at the storage location, initiate a retrieval of both the first data object and at the least one other data object associated with the signal, wherein placement of the first data object at the storage location based on the rule causes a retrieval time of the retrieval to be faster than if the first data object had been stored in accordance with a default storage ordering utilized by the data storage system for the persistent storage.

20. The non-transitory computer readable media of claim 14, wherein the rule indicates that multiple data objects associated with the signal are likely to be accessed or destroyed together in association with a future multi-object request.

\* \* \* \* \*